United States Patent
Higginson (10) Patent No.: US 9,983,867 B2
(45) Date of Patent: May 29, 2018

(54) SOFTWARE IMAGE PROVISIONING AND CHARGING SYSTEM

(71) Applicant: Phoenix Children's Hospital, Inc., Phoenix, AZ (US)

(72) Inventor: David Higginson, Phoenix, AZ (US)

(73) Assignee: Phoenix Children's Hospital, Inc., Phoenix, AZ (US)

(*) Notice: Subject to any disclaimer, the term of this patent is extended or adjusted under 35 U.S.C. 154(b) by 0 days. days.

(21) Appl. No.: 15/418,507

(22) Filed: Jan. 27, 2017

(65) Prior Publication Data
US 2017/0220333 A1    Aug. 3, 2017

Related U.S. Application Data

(60) Provisional application No. 62/288,284, filed on Jan. 28, 2016.

(51) Int. Cl.
| | |
|---|---|
| G06F 9/44 | (2018.01) |
| G06F 9/445 | (2018.01) |
| H04L 12/10 | (2006.01) |
| H04L 29/08 | (2006.01) |
| H04L 12/24 | (2006.01) |
| H04L 29/06 | (2006.01) |

(52) U.S. Cl.
CPC .............. *G06F 8/65* (2013.01); *H04L 12/10* (2013.01); *H04L 41/082* (2013.01); *H04L 67/306* (2013.01); *H04L 67/325* (2013.01); *H04L 67/34* (2013.01); *H04L 63/083* (2013.01)

(58) Field of Classification Search
CPC ......... G06F 8/65; H04L 12/10; H04L 41/082; H04L 63/083; H04L 67/34; H04L 67/306; H04L 67/325
USPC ........................................................ 717/173
See application file for complete search history.

(56) References Cited

U.S. PATENT DOCUMENTS

| | | | |
|---|---|---|---|
| 9,867,991 B2* | 1/2018 | Parker | A61N 1/37247 |
| 2010/0302958 A1* | 12/2010 | Wietfeldt | H04W 76/025 370/252 |
| 2011/0103609 A1* | 5/2011 | Pelland | H04M 1/0254 381/74 |
| 2013/0090942 A1* | 4/2013 | Robinson | G06Q 10/10 705/2 |
| 2013/0254358 A1* | 9/2013 | Phung | G06F 9/44505 709/222 |
| 2014/0282470 A1* | 9/2014 | Buga | G06F 8/65 717/170 |
| 2015/0186131 A1* | 7/2015 | Asnaashari | G06F 3/0605 726/9 |

* cited by examiner

*Primary Examiner* — Anna Deng (57) ABSTRACT

Systems and methods of the present invention provide for one or more centralized server computers communicatively coupled to a network and configured to: receive a request to update an image on a client device connected via the network. A software running on the central computer uses a USB signal conversion software, running on a kit computer and connected to the client device, to simulate the client device being directly connected to the server computer through the network for re-imaging of the client device. A data transfer/charging switch software on the kit computer switches the amperage of the kit computer appropriately to accommodate a data transfer and charging mode for the client device.

18 Claims, 9 Drawing Sheets

| File Edit Tools | ⇐ ⇒ |

User Control Panel for Parent

Your child is currently a patient in Room 123 of Downtown Hospital. Your child has access to a tablet computer with the following profile settings:

| Age: | Installed Programs In Use: | Programs available for installation: | Parental Controls: |
|---|---|---|---|
| 13 | Internet Access, Facebook, YouTube, 13 year old games | Instagram, SnapChat, Netflix, Call of Duty, Halo | Off |

If you feel that any of the settings for this profile are not age-appropriate, you may update the profile for your child's tablet to any of the following settings. Please select from the list below:

| Age: | Programs available for installation: | Parental Controls: |
|---|---|---|
| 10 | Internet Access, Netflix, YouTube, Strategy Games, Solitaire, Drawing Programs | On |
| 5 | Internet Access, Netflix, YouTube, Drawing Programs | On |
| 3 | Internet Access, Netflix, Drawing Programs | On |

Select Profile ▽
- Age 10 Profile
- Age 5 Profile
- Age 3 Profile

SOFTWARE IMAGE PROVISIONING AND CHARGING SYSTEM

CROSS REFERENCE TO RELATED APPLICATIONS

This application claims priority to U.S. Provisional Patent Application No. 62/288,284, filed on Jan. 28, 2016, and entitled "SOFTWARE IMAGE PROVISIONING AND CHARGING SYSTEM."

FIELD OF THE INVENTION

The present invention generally relates to the field of provisioning software images and particularly to a system for provisioning software images and charging a client device on which the software image is created.

SUMMARY OF THE INVENTION

The present invention provides systems and methods comprising one or more server computers communicatively coupled to a network and configured to: receive a request to update an image on a client device connected via the network. A software running on the central computer uses a USB signal conversion software, running on a kit computer and connected to the client device, to simulate the client device being directly connected to the server computer through the network for re-imaging of the client device. A data transfer/charging switch software on the kit computer switches the amperage of the kit computer appropriately to accommodate a data transfer and charging mode for the client device The above features and advantages of the present invention will be better understood from the following detailed description taken in conjunction with the accompanying drawings.

DETAILED DESCRIPTION

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

The disclosed invention provides means for erasing existing data on a client device, such as a mobile tablet, and replacing it with an updated image or profile. In the context of this invention, an image may comprise a collection of software and user profile or other settings specific to a particular user, for example, a hospital patient using a mobile tablet while being assigned to a particular hospital room during their stay. Using the disclosed invention, a user, possibly a guardian of the patient may request that a particular collection of software and settings (e.g., the image) for a particular location/hospital room be changed. Alternatively, a scheduling software running on a centralized server computer may recognize that a setting for a particular location needs to be updated (e.g., the patient has left the hospital, and a new, much younger patient will be occupying the room.

The disclosed invention may update the software and settings for a particular client device in a particular room using a network, rather than individually connecting each client device to a centralized server computer. Networks such as the network over which the current invention operates may comprise a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

Networks use Internet Protocol addresses to locate network resources. Each website, resource, and computer on the Internet has a unique Internet Protocol (IP) address. For example, in the present invention, a hospital may provide each patient, in each room of the hospital, with a client tablet device during their stay. Each of these client tablet devices may be connected to a centrally located server computer, which may identify each of the client devices on the network using the IP address assigned to each client device.

Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

Increasingly, mobile devices are designed with the ability to accept downloaded software to add to their functionality and flexibility. Users may download software to their desktop computers and then with a communication link, such as Universal Serial Bus (USB), proprietary connection protocols, custom cradles, and/or other connections, the software is transferred and installed on the mobile device. Additionally, some software requires the user to manually enter application configuration parameters using the desktop computer before they can become operational. This method of provisioning software ties the user to a desktop computer and going through manual steps thereafter.

Currently, if a user wants to update a profile or other settings on a mobile device, they must connect the mobile device directly to a computer via a USB connecting cable. This connection may be with devices individually, or using some type of hub that connects multiple mobile devices to a central machine simultaneously. Thus, current methods of updating profiles for mobile devices require that the mobile device be in close proximity (i.e., within the length of the USB cord) to the central machine. In situations where the mobile devices may be dispersed throughout rooms or locations in a larger environment (e.g., hospitals, schools, kiosks, hotels, cruise ships, etc.), or even across the country, the current model is ineffective for imaging and charging multiple mobile devices simultaneously. The disclosed invention overcomes these limitations by providing means for imaging multiple mobile devices over a network, possibly in diverse and remote locations, and charging each device through the network.

Figure 1:
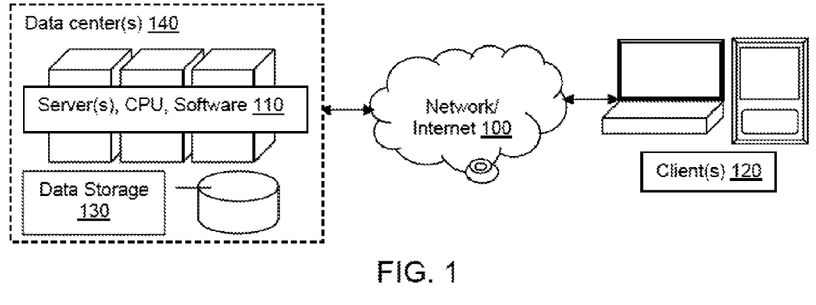
FIG. 1 illustrates a possible system for provisioning client device software images and charging the client devices.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 110 and at least one client 120 may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

Server(s) 110 may comprise any computer or program that provides services to other computers, programs, or users either in the same computer or over a computer network 100. The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The server 110 may be communicatively coupled to data storage 130 including any information requested or required by the system and/or described herein. The data storage 130 may be any computer components, devices, and/or recording media that may retain digital data used for computing for some interval of time.

Figure 2:
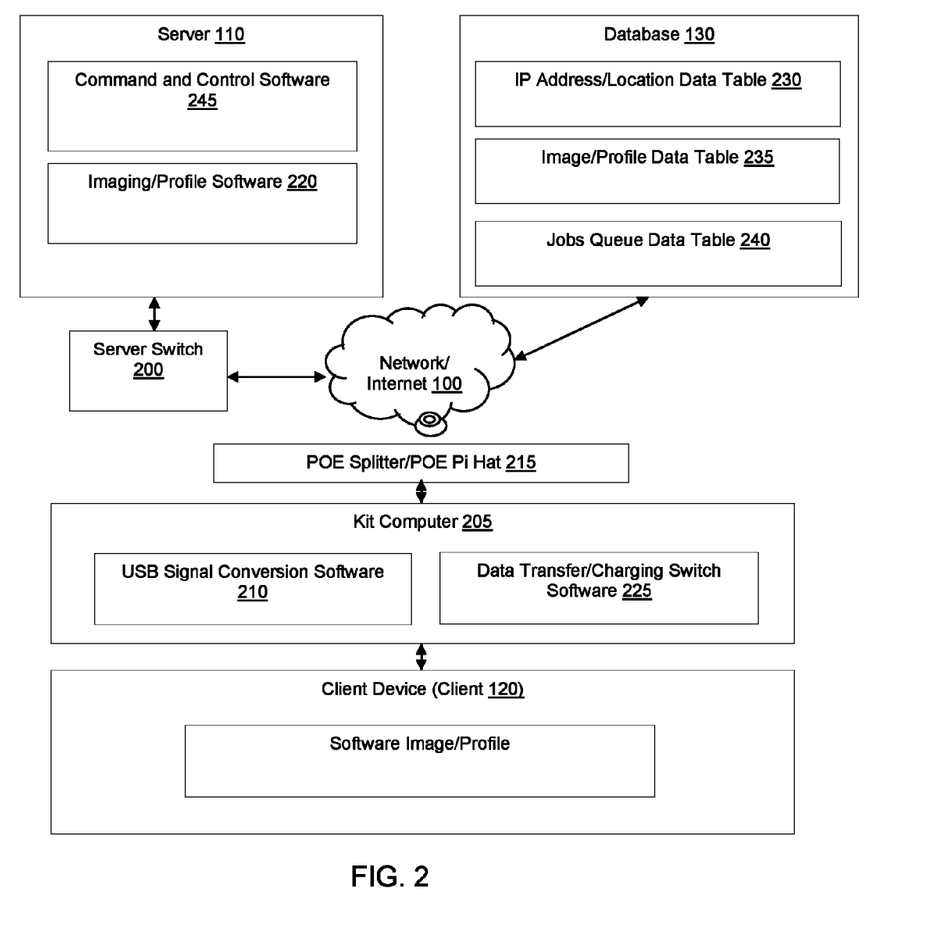
FIG. 2 illustrates a more detailed possible system for provisioning client device software images and charging the client devices.

FIG. 2 shows an overview of the environment in which the method steps of the current invention are performed. A centralized server 110 may run in, for example, a data center, server room or network closet. This central server 110 may comprise, for example, an Apple Macintosh machine or server, or any server running Windows server software. A processor on the central server 110 may read and execute instructions stored on the central server, causing the server to run any of the software modules described below.

The central server 110 may be connected to a network switch 200. This network switch 200 may accomplish multiple purposes. For example, the network switch 200 may connect the central server 110 with a plurality of client devices 120 (e.g., tablets or other remote devices) to achieve data transfer, such as re-imaging and/or changing user profiles being run on the client devices 120. To accomplish this, the switch may work in conjunction with the central server 110 to store and access, as needed, data mapping the central server to each IP address (e.g., a room number within a hospital) where each client device 120 is being operated. The IP address for the device may be assigned via a kit computer 205 and a USB signal conversion software 210 running on the kit computer and simulating a USB cable for the client device 120 being plugged directly into the central computer 110, as described in more detail below.

Figure 3:
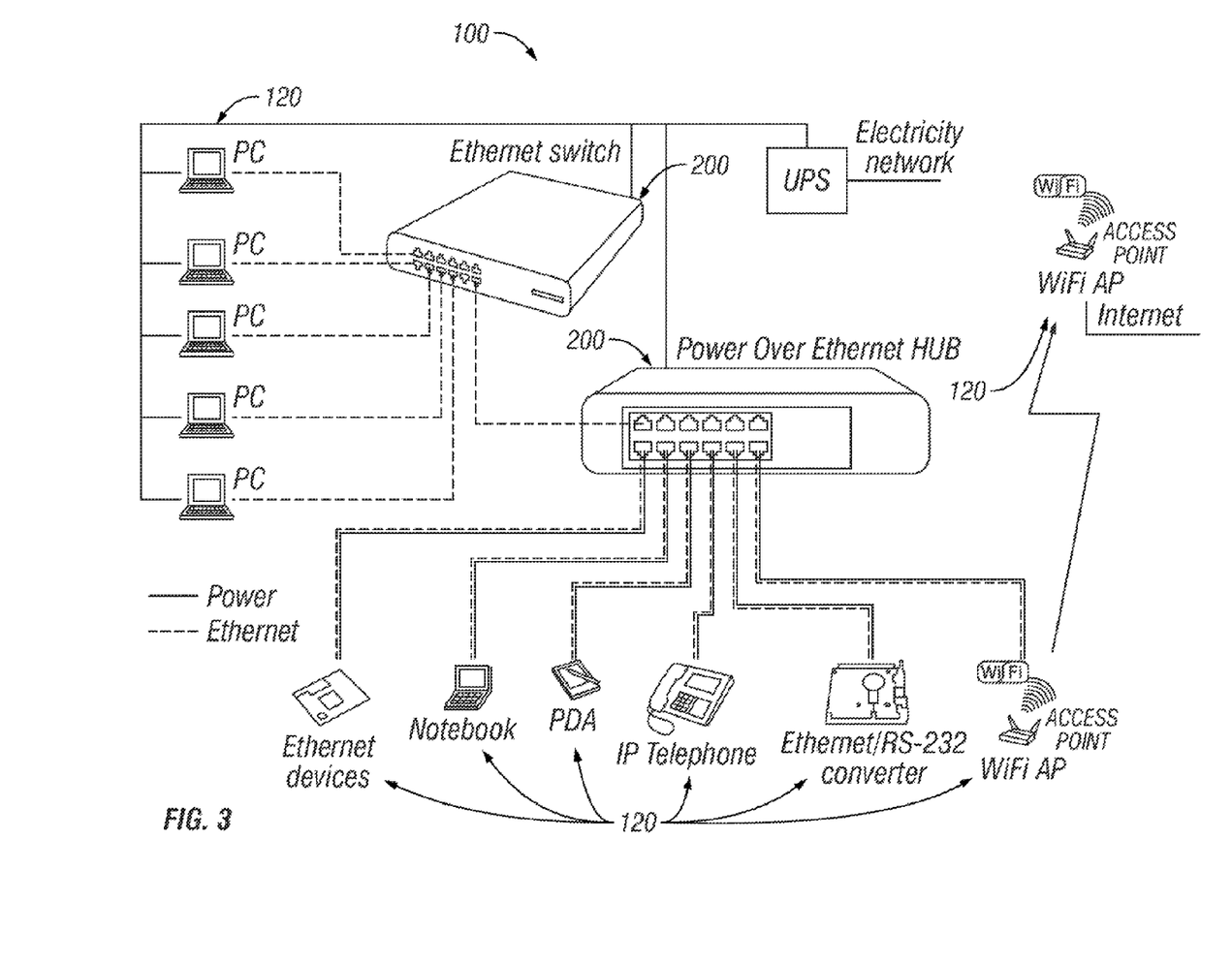
FIG. 3 is a non-limiting example of a Power of Ethernet configuration.

The network switch 200 may also provide power to the client device 110 and the kit computer 205 using Power Over Ethernet (POE). FIG. 3 provides a diagram demonstrating a broad overview of a POE environment. In this environment, the network 100 includes a network switch and/or network hub 200 providing POE to a plurality of client devices 120. POE uses a 110V or 240V output connected to the network switch 200. One of the strands of each network cable attached to the network switch 200 may be used to send a supply volt/network power injector to each network jack allowing client devices 120 attached to the network jack via a network cable to power the client device 120 on the other end of the network connection.

Each IP address location (e.g., a hospital room in a hospital in which the client device is operated) may include a network jack, allowing a client device 120 to connect to the network 100. A POE-capable network cable may connect the network jack to the kit computer 205, a client device 110, a POE splitter 215, a POE circuit board adapter used to power the kit computer and transfer data 215, and power any combination of this hardware via POE, or any other disclosed components.

Figure 4:
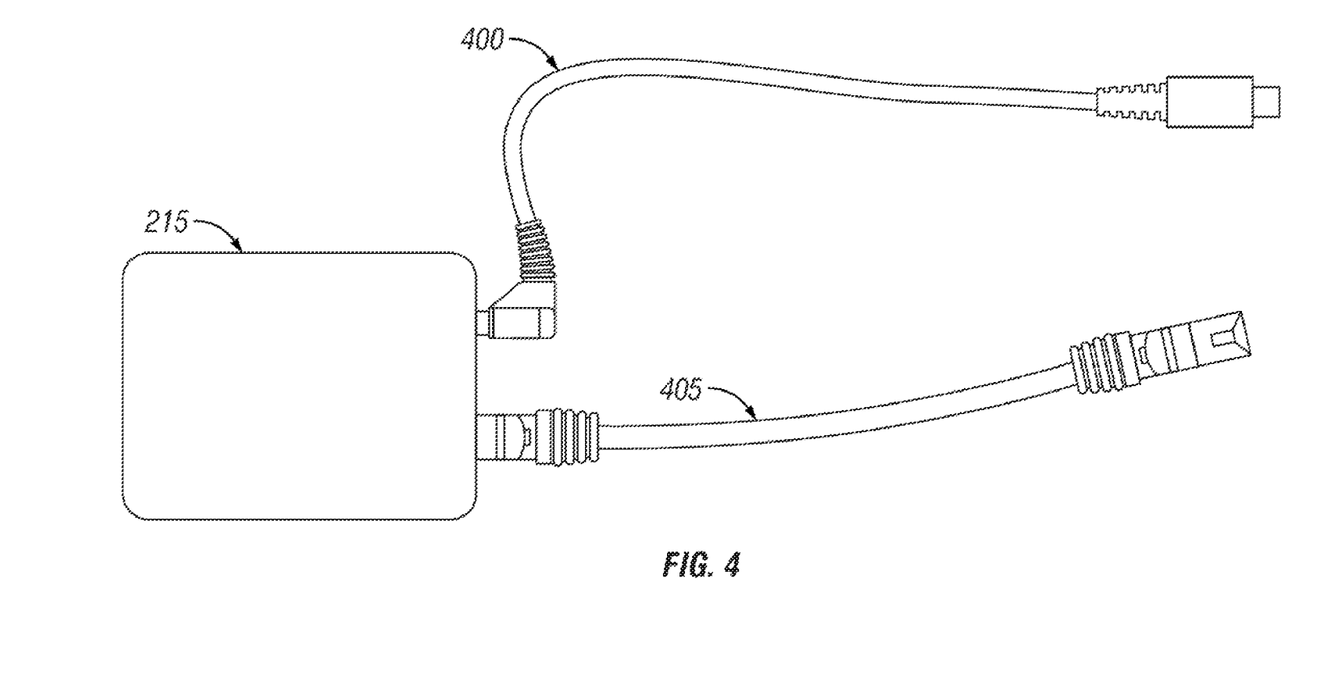
FIG. 4 is a non-limiting example of a Power of Ethernet splitter.

The POE splitter 215 may therefore use the network cable connecting the network jack with the POE splitter 215 to provide power to both the kit computer 205 and a network output cable from the POE splitter 215 in order to power additional devices connected to the network. An example of such a splitter is seen in FIG. 4. In this example embodiment, the POE splitter 215 divides the POE between a power supply for the kit computer 400 and a POE enabled Ethernet cable 405. In some embodiments, a micro USB cable adapter may be connected to both the POE splitter 215 and the kit computer 205, by way of a network-in jack on the kit computer, thereby providing power to the kit computer 205 from the POE enabled network cable by way of the attached splitter 215.

Figure 5:
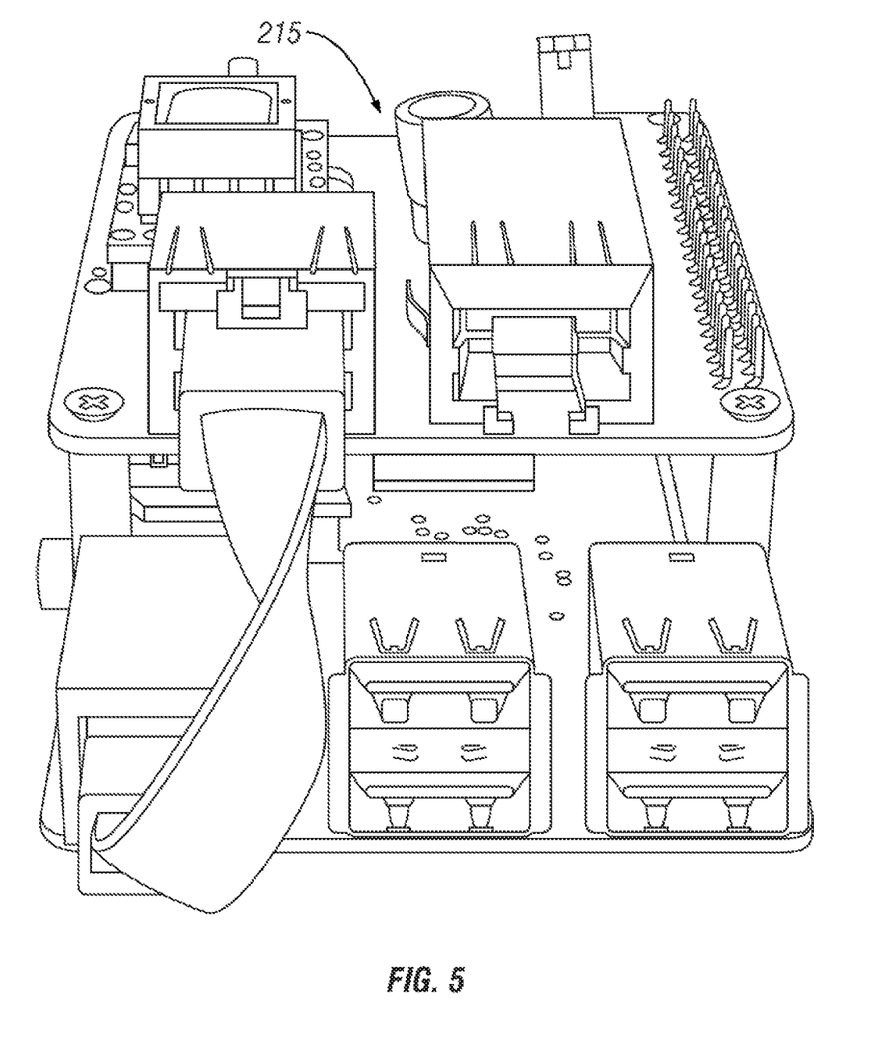
FIG. 5 is a non-limiting example of a circuit board that both powers a kit computer and transfers data and power to client devices.

In other embodiments, the kit computer 205 may be powered by a custom built circuit board (POE hat) 215 that is connected to the network jack and both powers the kit computer 205 and transfers data and power to client devices 110 by way of the POE enabled network cable. A non-limiting example of such a circuit board 215 is seen in FIG. 5. This POE hat may power the kit computer 205 over General Purpose Input/Output (GPIO) pins, but may leave all GPIO pins free for use with other add on boards. The POE hat may also include intelligent power management with an on-board micro-controller. The POE hat may also send an Ethernet signal over to the kit computer 205 using a patch cable.

Figure 6:
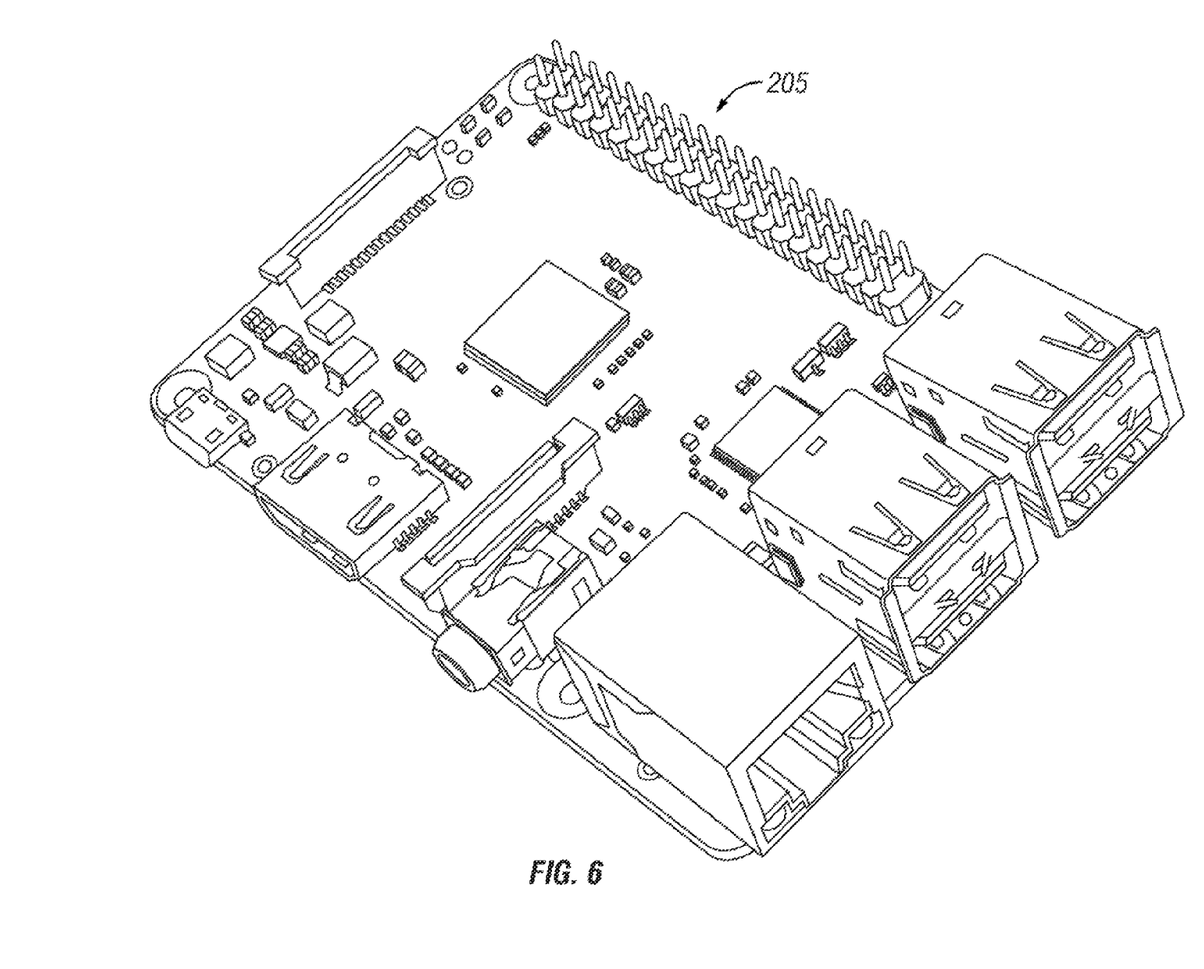
FIG. 6 is a non-limiting example of a kit computer.

The kit computer 205 may comprise any microcontroller circuit board used to execute instructions within the disclosed kit computing device, including mini hobbyist computers (e.g., Raspberry Pi) that include low power requirements, a very lightweight processor, an SD card, a network jack, a USB port, and runs an operating system, such as Linux or Windows. A non-limiting example of such a kit computer is seen in FIG. 6. Although a kit computer is used in the disclosed embodiments, any fully functional microcontroller circuit board, possibly used within a standard computer, may be used in place of the disclosed kit computer.

The network jack on the kit computer 205 provides means for the kit computer 205 to be assigned an IP address on the network 100, thereby making the kit computer 205 network addressable. Using this IP address, the central server 110 may identify the IP address on the network for the kit computer and connect through the network 100 to a USB signal conversion software 210 (e.g., VirtualHere) running on the kit computer. The USB signal conversion software 210 may use the IP address to simulate the USB cable connected directly to the central server. This may be accomplished by the USB signal conversion software 210 sending USB signals through the network via USB over IP technology. Once the IP address has been identified and the USB signals sent through the network 110, an imaging/user profile software 220 (e.g., iTunes) running on the central server 110 may receive the USB signals received through the network 110, identify the client device 120 attached to the USB port of the kit computer 205, and interpret the USB over IP signals as if the client device 120 was directly attached to the central server 110. After the appropriate software handshake, the central server 110 may then initiate a data transfer to re-image or change the profile on the attached client device 120.

The kit computer 205 may comprise memory used to run an operating system, which may run the USB signal conversion software 210 or any other proprietary software disclosed herein. For example, the kit computer 205 may run a proprietary data transfer/charging switch software 225, which may receive instructions to determine, for example, if a data transfer used to image the client device 120 is complete. If data transfer is complete, the data transfer/charging switch software 225 may modify the power output of the USB port on the kit computer 205 to accommodate charging the client device 120. Typically, a USB port outputs 0.5 amps in data transfer mode. However, this is not enough amperage to charge an attached device 120. The USB port on the kit computer must therefore be capable of being over-charged in order to trickle charge the client device 120. In some embodiments, a USB port on the kit computer 120 may be over-charged using POE to output up to 2.1 amps. However, in many tested instances, the USB port will output 1.3 amps. Because the output at 1.3 amps is too great for data transfer mode, and 0.5 amps is not sufficient to charge a client device 120, embodiments that both transfer data and charge the device require a proprietary software to determine when data transfer is complete, then switch the USB port output to 1.3 amps until another data transfer request is received, when the USB port output will be reduced back to 0.5 amps.

Returning now to FIG. 2, the central server 110, the kit computer 205, the client device 120 and/or any other disclosed components may be coupled through the network 100, possibly using the network switch 200, to the database 130, which may store and provide the data required for the disclosed system to perform the disclosed method steps. This data may be organized into a collection of data tables 230-240. Each of these data tables may be made up of a collection of data records. For example, the disclosed system may comprise a plurality of network connections comprising network jacks operating in various locations (e.g., a plurality of hospital rooms in a hospital). Each of these locations may be attached to a running client device 120 with a specific image or user profile, and the client device may be identified on the network by an IP address. The database 130 may therefore reflect the location and IP address via one or more data records in an IP address/location data table 230, storing an association of each physical location with an IP address on the network, as well as an image running on the client device 120 at that location.

This data table may therefore act as a dictionary defining the association between IP addresses, physical locations and client device images. The software management solutions disclosed herein may therefore contain the equivalent of routing and lookup tables, as well as a routing table software, which makes the connections between the central server 110 and the individual client devices 120 via the IP address, thereby allowing the client devices 120 to be connected via a wide or local area network, as long as the IP address for the kit computer 205 is exposed to software running on the central server 110.

An image/profile data table 235 may comprise one or more data records defining each of the images in more detail. For example, each image may be associated with an assigned number, associated with the image or profile settings to be applied to each of the client devices if assigned that image/profile number. For example, data fields in the image data record may include an image number, the software applications in this image to be installed on the client device, an appropriate age for such software applications, parental guidance or control settings which may be turned on or off for that image/profile, a device serial number, a user ID (e.g., Apple ID), etc. In some embodiments, the image/profile data may be synced with the images/profiles stored on the central computer as software images and settings, so that when the request for a specific image is requested and/or identified in the image/profile data table 235, the image and settings identified in those profiles may be applied.

A jobs queue data table 240 may comprise one or more data records defining requests from users for an update to the image/profile of a client device 120 in a specific location. Each of the data records in the jobs queue data table 130 may include data such as a job id, an IP address/location associated with the request and an image number requested. As non-limiting examples, when a patient is discharged, or a child's guardian believes the child's client device needs to be re-imaged, a user may request that the software and the settings for the client device be erased and re-imaged to a new profile.

The disclosed invention may process the data in database 130 via one or more software modules running on the disclosed hardware. A command and control software 245 may run on the central server 110. This command and control software 245 may query the database 130 for requested information and format and display retrieved data as requested. The command and control software 245 may also query the database 130 to determine whether the jobs queue data table 240 comprises any database records.

The jobs queue data table 240 may be populated with data defining any processes described herein, as well as any commands received causing these processes to be executed. As non-limiting examples, the jobs queue table 240 in the database 130 may comprise a plurality of data records, each comprising commands added via user input, automated processes (e.g., a command requiring a reboot of each kit computer 205 at 11:15 each night), or inserted from other applications (e.g., via a web page available to a parent of a patient, such as that seen in FIG. 8, or a dashboard accessible to a user or administrator for the system, such as a nurse). If the command and control software determines that the jobs queue data table 240 comprises one or more data records, the command and control software 245 may proceed with the process steps outlined below. The command and control software 245 may also include instructions to transmit requests and instructions to additional hardware and software in the disclosed invention.

For example, the command and control software 245 may work in conjunction with a USB bridging software running on the central server (not shown), and/or the disclosed USB signal conversion software, to create a connection between the central server 110 and the kit computer 205. This connection between the central server 110 and the kit computer may, in turn, trigger a detection of a bridged USB connection between a client device 120, connected to the kit computer via a USB cable, and the central server 110. The detection of this connection between the client device 120 and the central server 110 may, in turn, cause the new image or settings for the client device 120 to be deployed to the client device 120, as if the client device 120 was connected directly to the central server 110 via the USB cable. Once deployed, the central server 110 may detect completion of the deployment, and disconnect the bridged USB connection to move on to additional processes to be executed from the jobs queue data table 240.

In another example, the command and control software 245 may send a signal to the data transfer/charging switch software 225 requesting, from a software perspective, a change to the power output by the USB port on the kit computer. The data transfer/charging switch software 225 may run on the kit computer 205 and, from a software perspective, control the power being output to the USB port. The software may configure the kit computer to overcharge the USB port, increasing the power output up to 2.1 amps, allowing the kit computer to charge the client device. When the data transfer/charging switch software determines that a data transfer mode is requested, it may flip the switch from a charging mode to a data transfer mode, switching the power output of the USB port to 0.5 amps, appropriate for data transfer.

Figure 7:
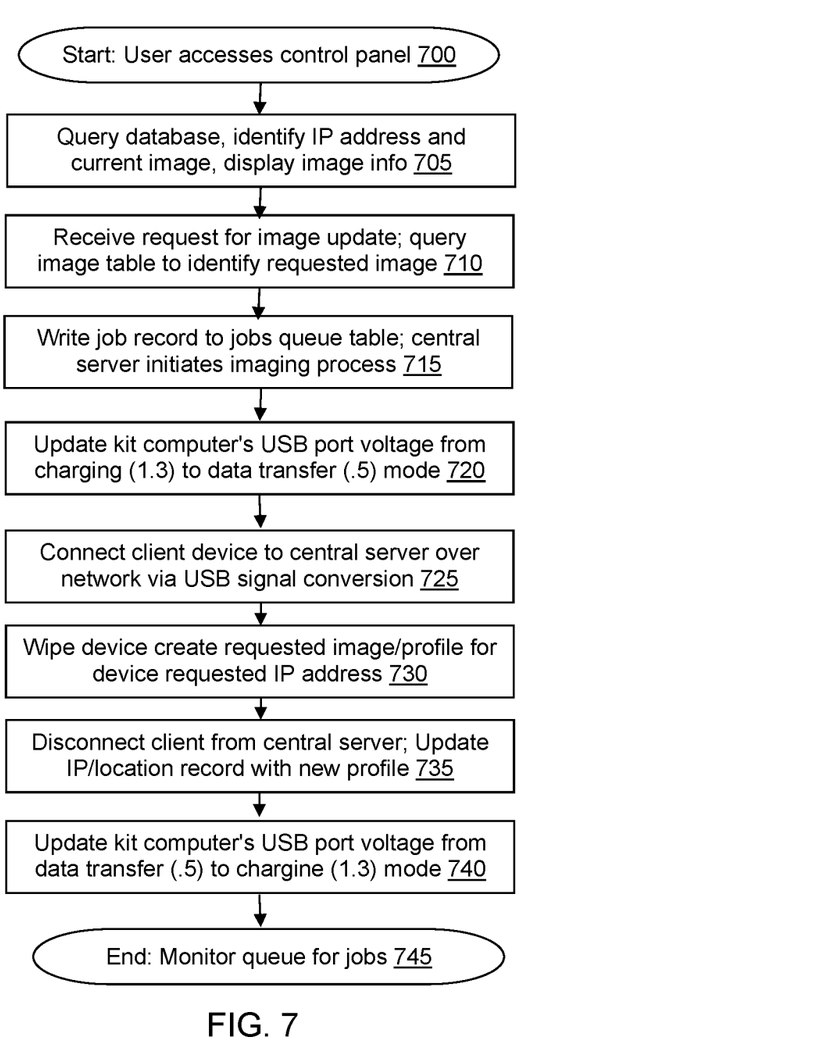
FIG. 7 illustrates a flow diagram for provisioning client device software images and charging the client devices.
Figure 8:
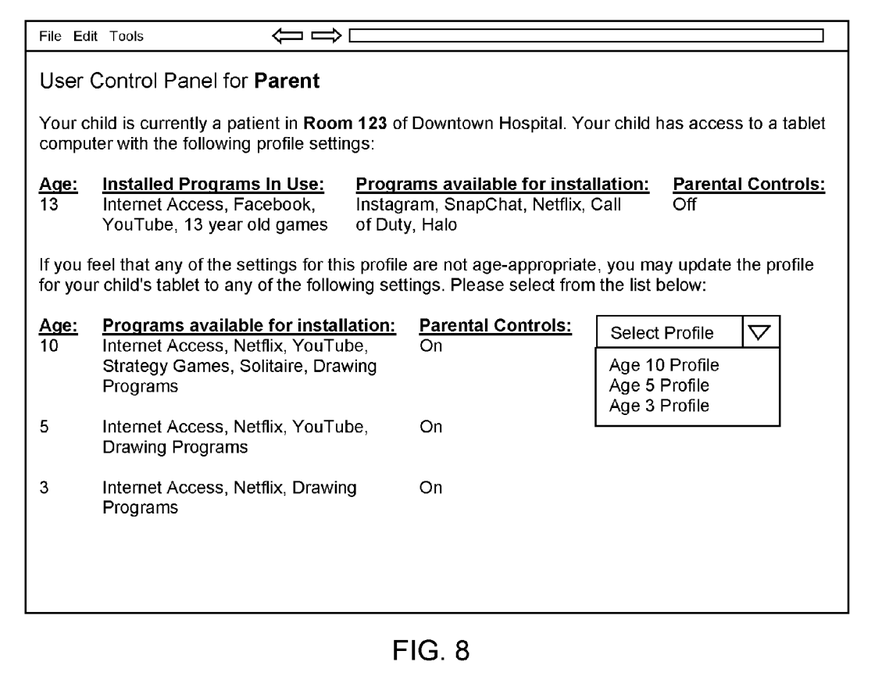
FIG. 8 is an example embodiment of a user interface used in provisioning client device software images and charging the client devices.

FIG. 7 is a flow diagram representing a process flow for the disclosed invention. In step 700, a user may access a web page or other client software comprising a control panel, the control panel further comprising a plurality of user interface elements allowing the user to input data. FIG. 8 is a non-limiting example of such a control panel. The user may be authenticated to the control panel, possibly by entering a username and password, for example. In some embodiments, the user, after authentication, may select the location, such as a room number, identifying the client device to be updated. In other embodiments, such as that seen in FIG. 8, the authentication of the user may be associated, in the database, with a specific location (e.g. Room 123 in FIG. 8). In these embodiments, the command and control software 245 may generate a control panel specific to that location and display it to the user.

In step 705, the command and control software 245 may query the IP address/location data table 230 to determine the IP address associated with the room number in which the client device 120 is running, and identify the current image (possibly by cross referencing the image/profile data table 235) associated with the client device 120 at the identified IP address/location. The command and control software 245 may then display, on the control panel, the details of the current image associated with the IP address/location. The command and control software 245 may also query the image/profile data table 235 and generate content for the control panel, based on the returned data, listing additional image/profile options available to the user.

In step 710, the control panel user may enter a request to update the current image for the room by selecting user interface elements on the control panel (e.g., the dropdown list for selecting a profile in FIG. 8). This request may be transmitted to the command and control software 245. The command and control software running on the central server may receive the request, identify the location/IP address associated with the request, and identify the requested image/profile, possibly by submitting a query to the appropriate data tables 230, 235.

In step 715, the command and control software 245 may then write a job record to the jobs queue data table 240 including the identified IP address/location and the image requested for that IP address/location. The command and control software 245 may then determine that at least one job record exists in the jobs queue table, and initiate the imaging process according to the data in the job record.

In step 720, the command and control software transmits a charging/data transfer switch request to the data transfer/charging switch software 225 running on the kit computer 205 at the identified IP address. This request switches, from a software perspective, the output of the USB port connected to the client device, from 1.2-1.3 amps, which is used for charging the device, to 0.5 amps, appropriate for a data transfer to the device.

In step 725, once the output of the USB port on the kit computer 205 has been switched to data transfer mode (outputting 0.5 amps), the data transfer/charging switch software 225 may transmit a notification to the command and control software 245 confirming that it is now in data transfer mode. In response, the command and control software 245 may send a request to the USB signal conversion software 210, running on the kit computer 205 at the identified IP address, to begin transmitting the appropriate USB signals to the imaging/profile software 220, running on the central server 110, indicating that the client device 120 is connected and creating the appropriate software handshake connection between the client device 120 and the imaging/profile software 220 in order to begin the data transfer of the new image to the client device.

The USB signal conversion software 210 running on the kit computer at the identified IP address may therefore create a connection from the central server 110 to the identified IP address in such a way that the imaging/profile software 220 performs data transfer as if the client device 120 is attached via a USB cable directly to the central server 110. On the network side, the USB signal conversion software 210 extends the USB cable as if it was a network device, and turns each client device 120, using its IP address, into a network addressable hardware, thereby virtually extending the length of the USB cable and setting the software on the client device 120 ready/waiting to be imaged.

Having identified the requested image/profile, the command and control software 245 may transmit a request to the imaging/profile software 220 to install the requested image or profile. In some embodiments, the imaging/profile software 220 may erase the current software and settings for a client device image and install the requested image without user interaction, using software such as GROUND CONTROL. The imaging/profile software 220 may access software libraries (e.g., ITUNES libraries or software settings) installed on the central server 110 in order to act as a controlling mechanism for sending image payloads and device commands and settings to the client device 120.

In step 735, the imaging/profile software 220 may then connect with the client device connected at the identified IP address, erase the software and settings for the current image/profile, and create the requested image/profile on the client device.

The imaging/profile software 220 may then send a transmission to the command and control software 245 indicating that the software and settings for the current image/profile have been erased and that the imaging of the client device 120 is complete. To accomplish this, the imaging/profile software 120 may include a configuration setting (e.g., GROUND CONTROL'S WEBHOOK) instructing the imaging/profile software 120, when finished with the erasure/imaging of the client device 120, to post, possibly via an HTTP POST command, a specific URL (e.g., GET https://www.downtownhospital.com/GroundControl/Webhook.aspx.?UDID=[DeviceUDID]&Serial=[DeviceSerial]&JobNumber=[JobNumber]&status=Starting&LaunchPad=[LaunchpadName]&ActionID=[ActionID]) that includes specific parameters. The command and control software 245, or other software running on the central may comprise a listening web page that receives the posted URL and records them, possibly in the database 130. The command and control software 245 may then be configured to check the source of the commands at a regular interval (e.g. every 5 seconds) during processing to see if the job has been completed.

On receiving the transmission that the software and settings for the current image/profile have been erased and that the imaging fo the client device 120 is complete, the command and control software 245 may send a transmission to the USB signal conversion software 210 indicating that the client device 120 at the identified IP address/location has been erased and updated with the requested image/profile.

In step 735, the USB signal conversion software 210 may then disconnect the client device from the imaging/profile software 220 on the central server 110, and send a transmission to the command and control software 245 that there is no longer a connection between the client device 120 and the imaging/profile software 220. The command and control software 245 may then update the appropriate record in the IP address/location data table 230 to reflect the updated image/profile on the client device at the identified IP address/location, and delete the job record for the request from the jobs queue data table 240.

In step 740, the command and control software 245 may send a transmission to the data transfer/charging switch software 225, running on the kit computer 205, that the data transfer is complete and to switch the power output for the USB port from data transfer mode, at 0.5 amps, to charging mode, at 1.3 amps. The data transfer/charging switch software 225 may then update the power output of the USB port to charge the client device. To accomplish this power output update, the command and control software 245 may connect to the kit computer 205 using any means of connection described herein. The lookup table within the database 130 may be used to identify the IP address of the client device 120, and additional stored data may be used to authenticate the credentials of the connection between the central server 110 and the client device 120. As a non-limiting example, a connection may be established between the command and control software 245 and the kit computer 205 via a telnet or SSH command, as is known in the art. Once connected to the remote kit computer 205, the command and control software 245 may execute a piece of embedded software on the kit computer with a parameter that either says send 0.5 amp to USB, or to send overcharging power to the USB. This small piece of software may be a proprietary software specifically written for the kit computer to control the USB ports. Once the command is issued, the command and control software 245 records the response from the remote kit computer program (success or failure on switch of power), and logs and acts accordingly.

In Step 745, The command and control software 245 may then query the jobs queue data table 240 to determine if there are additional jobs in jobs queue. If so, the process described above may be repeated for each of the jobs in the queue.

Figure 9:
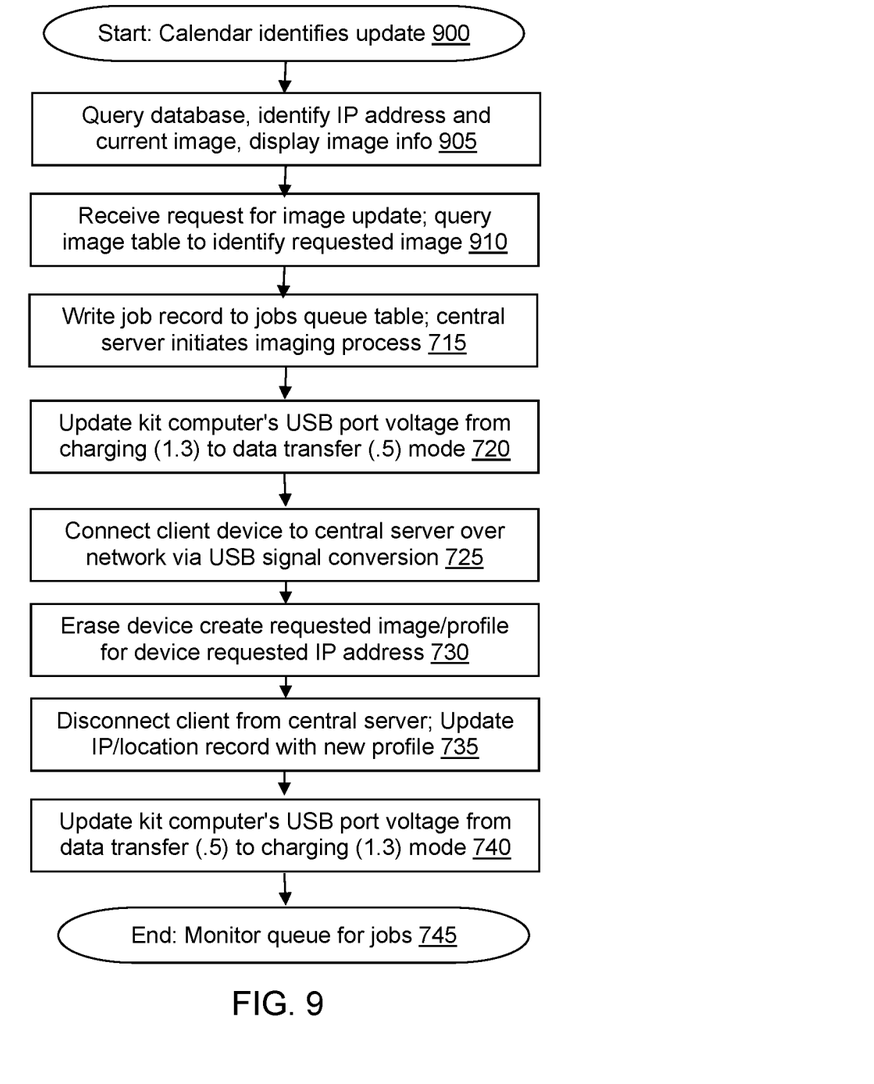
FIG. 9 illustrates a flow diagram for provisioning client device software images and charging the client devices.

FIG. 9 is a flow diagram representing a process flow of another possible embodiment of the disclosed invention. In step 900 of this embodiment, a scheduling/location software 250, possibly running on the central server 110, may automatically track events and provide data for the command and control software to update the image on a client device 120 in a specific location based on a calendar event. As a non-limiting example, a hospital may have a schedule of incoming and outgoing patients for specific rooms, as well as the age of the incoming or outgoing patient and/or user preferences for the patient's client device 120. The calendaring software in this example may determine, from the schedule, that a 65 year old patient's stay in a specific hospital room is ending, and that the room will now be occupied by a 5 year old. The scheduling software may then automatically transmit, according to the scheduling software, the information for the patient's age and preferences to the command and control software.

In step 905, the command and control software 245 may query the IP address/location data table 230 to determine the IP address associated with the room number in which the client device 120 is running, and identify the current image (possibly by cross referencing the image/profile data table 235) associated with the client device 120 at the identified IP address/location.

In step 910, a transmission from the scheduling/location software 250, possibly triggered by the identified event, may transmit a request to the command and control software 245 to update the current image for the room. The command and control software may receive the request, identify the location/IP address associated with the request, and identify the requested image/profile, possibly by submitting a query to the appropriate data tables 230, 235. Steps 715-745 may proceed as outlined above.

In some embodiments, the command and control software 245 may also send a transmission to each connected device 120 (e.g., on a 30 minute cycle) confirming that the device is still active. If no response is received from a device, the command and control software may issue a reboot command to each non-responsive or non-functional kit computer devices 205. In some embodiments, the USB cable may be permanently connected to the client device 120 so that it is always available to the command and control 245 and the imaging/profile software 220. In some embodiments, a wireless network may be used, in which the client device 120 may be plugged into a cradle for charging.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising:
a microcontroller circuit board coupled to a network using a power over Ethernet (POE) connection;
a client device coupled to the microcontroller circuit board using a USB cable;
a server computer coupled to the network and comprising at least one processor executing instructions within a memory, the instructions causing the server computer to:
receive, from a user interface (UI) displayed on a client computer software application, a first transmission encoding a request for an updated software image on the client device, wherein the first transmission includes a physical location of the microcontroller circuit board;
transmit instructions to the microcontroller circuit board activating, on the microcontroller circuit board:
a USB signal conversion software simulating a direct USB connection between the client device and the server computer; and
a data transfer and charging software configured to update a power output level of the microcontroller circuit board for transferring data to the client device;
query a database coupled to the network to identify the requested updated software image, wherein querying the database includes identifying a network address including an internet protocol (IP) address or a media access control (MAC) address associated in the database with the microcontroller circuit board and a physical location with the network address;
transmit the updated software image to the client device via the simulated direct USB connection;
transmit, to the microcontroller circuit board associated with the network address, instructions to:
erase a client memory on the client device connected to the microcontroller circuit board; and
install the updated software image on the client device; and
responsive to receipt of a second transmission encoding a confirmation that the updated software image has been installed on the client device, transmit instructions to the microcontroller circuit board causing the microcontroller circuit board to update the power output of the microcontroller circuit board for charging the client device.

2. The system of claim 1, further the instructions cause the server computer to:
store the updated software image in the database in association with the physical location, the microcontroller circuit board, or the IP address.

3. The system of claim 2, wherein the IP address is assigned by the USB signal conversion software.

4. The system of claim 1, wherein the instructions include a USB bridging software configured to communicate with the USB signal conversion software to simulate the direct USB connection between the client device and the server computer.

5. The system of claim 1, wherein a USB over IP technology simulates the direct USB connection between the client device and the server computer.

6. The system of claim 1, wherein the microcontroller circuit board includes a network jack used by the USB signal conversion software to assign an IP address to the microcontroller circuit board.

7. The system of claim 1, wherein the microcontroller circuit board is self-powered, and is further configured to transfer data and power to the client device.

8. The system of claim 1, wherein the updated software image comprises a collection of software packages to be run on the client device, the software packages being associated in the database with a user profile according to an age or age group.

9. The system of claim 1, wherein the first request is generated according to a schedule or a calendar configured to identify at least one user of the updated software image.

10. A method, comprising:
receiving, by a server computer coupled to a network and comprising at least one processor executing instructions within a memory, from a user interface (UI) displayed on a client computer software application, a first transmission encoding a request for an updated software image on a client device coupled, using a universal serial bus (USB) cable, to the a microcontroller circuit board coupled to the network using a power over Ethernet (POE) connection, wherein the first transmission includes a physical location of the microcontroller circuit board;
transmitting, by the server computer to the microcontroller circuit board, instructions activating, on the microcontroller circuit board:
a USB signal conversion software simulating a direct USB connection between the client device and the server computer; and
a data transfer and charging software configured to update a power output level of the microcontroller circuit board for transferring data to a client device;
querying, by the server computer, a database coupled to the network to identify the requested updated software image, wherein querying the database includes identifying a network address including an internet protocol (IP) address or a media access control (MAC) address associated in the database with the microcontroller circuit board and a physical location with the network address;

transmitting, by the server computer, the updated software image to the client device via the simulated direct USB connection;

transmitting, by the server computer to the microcontroller circuit board associated with the network address, instructions to:

erase a client memory on the client device connected to the microcontroller circuit board; and     install the updated software image on the client device; and responsive to receipt of a second transmission encoding a confirmation that the updated software image has been installed on the client device, transmit instructions to the microcontroller circuit board causing the microcontroller circuit board to update the power output of the microcontroller circuit board for charging the client device.

11. The method of claim 10, further comprising the steps of:

storing, by the server computer, the updated software image in the database in association with the physical location, the microcontroller circuit board, or the IP address.

12. The method of claim 11, further comprising the step of assigning the IP address by the USB signal conversion software.

13. The method of claim 10, further comprising the steps of:

communicating, by a USB bridging software running on the server computer, with the USB signal conversion software running on the microcontroller circuit board; and     simulating, by the USB bridging software, the direct USB connection between the client device and the server computer.

14. The method of claim 10, further comprising the step of simulating, by a USB over IP technology, the direct USB connection between the client device and the server computer.

15. The method of claim 10, further comprising the step of assigning, by a network jack on the microcontroller circuit board, an IP address to the microcontroller circuit board using the USB signal conversion software.

16. The method of claim 10, further comprising the step of transferring, by the microcontroller circuit board, data and power to the client device.

17. The method of claim 10, further comprising the steps of running, on the client device, the updated software image, wherein:

the updated software image comprises a collection of software packages; and     the software packages are associated in the database with a user profile according to an age or age group.

18. The method of claim 10, further comprising the step of generating, by a schedule or a calendar software running on the server computer, the request, the schedule or the calendar software being configured to identify at least one user of the updated software image.

\* \* \* \* \*